INVENTOR
Duane K. McDermond

BY Toulmin & Cox
Earl Levy
ATTORNEY

SYNCHRONOUS COUNTER

Filed July 24, 1967 3 Sheets-Sheet 2

INVENTOR
Duane K. McDermond

BY [signature]
Earl Levy
ATTORNEY

June 23, 1970 D. K. McDERMOND 3,517,318

SYNCHRONOUS COUNTER

Filed July 24, 1967 3 Sheets-Sheet 3

INVENTOR
Duane K. McDermond

BY [signature]
Earl Levy
ATTORNEY

United States Patent Office 3,517,318
Patented June 23, 1970

3,517,318

SYNCHRONOUS COUNTER

Duane K. McDermond, Gambrills, Md., assignor to the United States of America as represented by the Administrator of the National Aeronautics and Space Administration Filed July 24, 1967, Ser. No. 655,677
Int. Cl. H03k *21/06, 23/04*
U.S. Cl. 328—42 8 Claims

ABSTRACT OF THE DISCLOSURE

A counter comprises a plurality of cascaded binary stages, each of which, except the first, is driven by the previous stages and an input source through a NAND gate. Each NAND gate is connected directly to the input pulse source and to the output of the preceding flip-flop, as well as to complementary outputs of all of the other preceding flip-flops. Also disclosed is a digitally controlled oscillator, driven by a counter as described.

The invention described herein was made by an employee of the United States Government and may be manufactured and used by or for the Government for governmental purposes without the payment of any royalties thereon or therefor.

The present invention relates generally to counters and more particularly to a counter comprising a plurality of binary stages, only one of which changes state at a time.

All prior art binary counting chains with which the inventor has familiarity, have employed switching arrangements wherein a plurality of stages are simultaneously switched from one state to another. Switching a plurality of binary counter stages simultaneously has a number of disadvantages, relating to power consumption, imprecise triggering, noise and transients. In particular, the power consumed by a counter wherein a plurality of stages are simultaneously switched from one state to another, requires a driving pulse source of considerable current. If the driving pulse source does not have adequate power and current, there is a relatively great possibility that certain of the stages draw an excessive amount of current relative to other stages, and prevent switching of other stages. Imprecise triggering, causing delays and, possibly, failure at all to trigger, occurs with prior art binary counters because of propagation delays occurring in the counter stages. Propagation delays can, in some instances, be so great as to cause interstage switching subsequently to the termination of input pulses. In other words, a counter stage requires a finite time to trigger from one state to another. When a plurality of stages are cascaded, these intervals are compounded and may, in toto, be greater than the duration of a pulse feeding the counter. Such an occurrence prevents triggering of a higher order stage which must be switched in response to triggering of a multiplicity of previous stages and the input pulse.

According to the present invention, a counting chain is provided wherein only one stage is triggered at a time. In a preferred embodiment of the invention, triggering is accomplished by connecting a NAND gate to the input of the Ith counter stage. The NAND gate is connected to be responsive to an input pulse source and to the output of the (I–1)th counter stage. The Ith NAND gate responds to the complementary outputs of each of the other preceding stages [1, 2 . . . (I–2)], whereby the Ith stage is activated to the exclusion of all other stages.

By arranging a counting chain in the manner described, whereby only one counter stage is switched at a time, the problems associated with power consumption, transients, noise and imprecise triggering are obviated. In addition, the triggering pulses applied to the various stages can be combined in a facile manner to provide waveforms having a zero redundancy factor, i.e., waveforms derived by linearly combining the outputs of the counter NAND gates have transitions synchronized with each NAND gate transition.

It is, accordingly, an object of the present invention to provide a new and improved counter.

Another object of the invention is to provide a counter wherein only one binary stage is activated at a time.

Still another object of the invention is to provide a new and improved counter that draws low power from a pulse source, is not subject to imprecise triggering, and is relatively immune to false triggering by noise and transients.

A further object of the invention is to provide a new and improved counter controlled pulse source synthesizer, wherein the pulses are not necessarily periodic, and each pulse transition has a corresponding counter transition.

The above and still further objects, features and advantages of the present invention will become apparent upon consideration of the following detailed description of one specific embodiment thereof, especially when taken in conjunction with the accompanying drawings, wherein.

Figure 1:
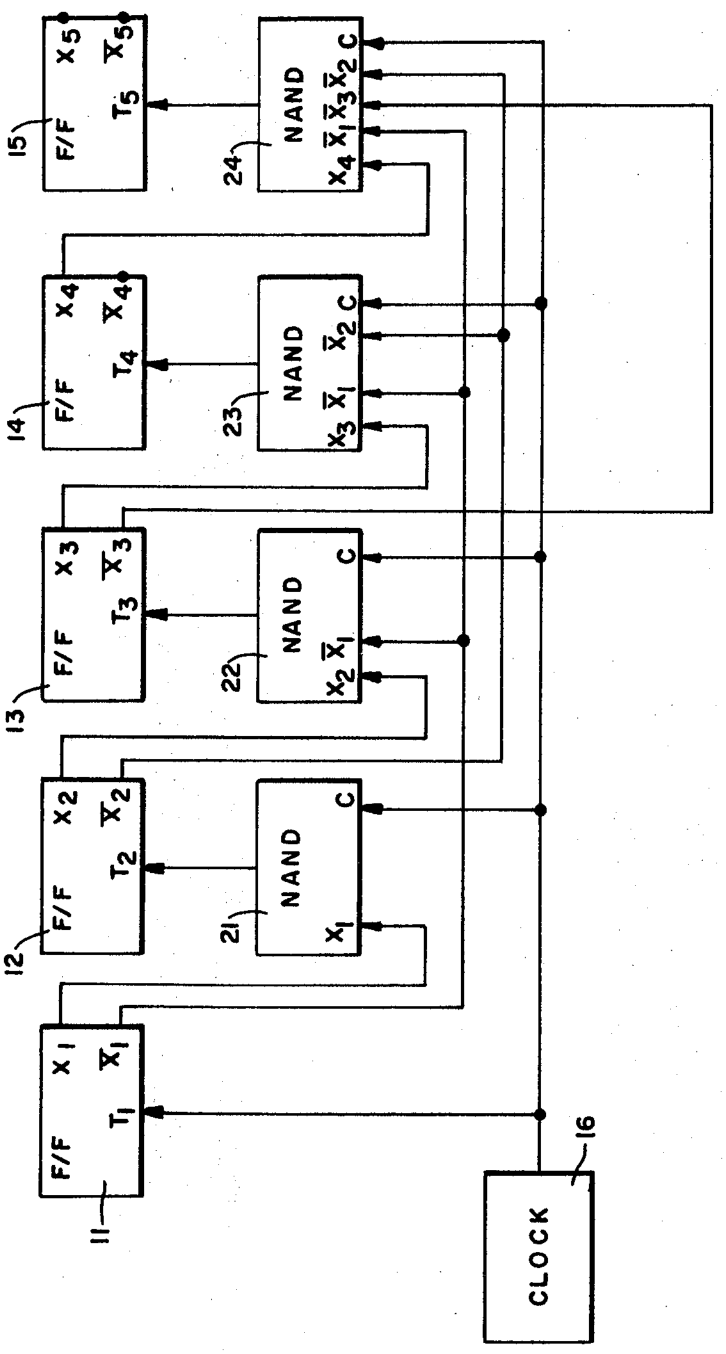
FIG. 1 is a block diagram of one preferred embodiment of a counter according to a preferred embodiment of the invention.

Refernce is now made to FIG. 1 of the drawings wherein five cascaded, binary flip-flop stages 11–15 are connected as a counter. Each of the flip-flop stages 11–15 is of the conventional, transistor bistable type, wherein the application of a negative going waveform to its input terminals, $T_1$–$T_5$, respectively, results in the flip-flop state being switched. Each of stages 11–15 includes a pair of complementary outputs ($X_I$, $\overline{X}_I$, where $X_I$ is the output of the Ith stage) whereby a positive voltage is derived from one of the outputs while a zero voltage is derived from the other output.

Stages 11–15, generally denominated as stages 1, 2 . . . I . . . N (herein N=5), are interconnected with each other and pulses from clock source 16 via NAND gates 21–24. Square wave pulses from clock source 16 are applied in parallel to input terminal $T_1$ of flip-flop stage 11 and to the input terminals $T_2$–$T_5$ of flip-flop stages 12–15 via NAND gates 21–24, respectively.

The NAND gate feeding flip-flop stage I is connected with clock source 16 and the outputs of the lower order flip-flop stages [1, 2 . . . (I–1)], whereby the clock pulse source and the next lowest order stage (I–1) are coupled to the NAND gate for the Ith stage in unmodified form, while the outputs of all other lower order stages (1, 2 . . . I–2) are coupled in complementary form to the input of the NAND gate feeding the Ith stage. Thus, NAND gate 21, feeding input terminal $T_2$ of flip-flop 12 is connected to be responsive to the $X_1$ output of flip-flop 11, and pulses (C) from clock 16. NAND gate 22 respons to the $X_2$ output of flip-flop 12 and clock pulse C, and to the $\overline{X}_1$ output of flip-flop 11. In a similar manner, NAND gate 23 responds to the $\overline{X}_1$, $\overline{X}_2$ and $X_3$ outputs of flip-flops 11, 12 and 13 and C pulses from clock pulse source 16. Responding to the complementary $\overline{X}_1$, $\overline{X}_2$ and $\overline{X}_3$ outputs of flip-flops 11 and directly to the $X_4$ output of flip-flop 14 and pulses from clock 16 is NAND gate 24.

By arranging flip-flops 11–15 and NAND gates 21–24 in the manner stated, only one of the flip-flops is switched at a time and switching of the Ith stage is always accomplished exactly in the center of the square wave of the (I–1)th flip-flop stage. By switching flip-flops 11–15 in the manner stated, high operating speed, low power consumption and elimination of noise due to transients are provided. High speed is attained because the Ith flip-flop is triggered only in response to transitions from source 16. The amount of power required and the possibility of erroneous results introduced by noise are optimized because the amount of current that clock source 16 must feed to the various flip-flops at one instant of time is a minimum.

In a preferred embodiment of the invention, flip-flops 11–15 and NAND gates 21–24 are preferably integrated, transistor circuits. Flip-flops 11–13 are Signetics Corporation circuits SE 124, while flip-flops 14 and 15 are Texas Instrument flip-flops SN 510 and NAND gates 21–24 are Signetics NAND gates SE 101. NAND gate 24 is modified, with an additional diode, so that it can handle five input signals in a NAND configuration. While integrated transistor circuits have been specifically utilized in the invention to conserve space and power requirements, it is to be understood that other types of active elements, such as vacuum tubes, discrete semiconductor circuits and magnetic core circuitry can be employed.

Figures 2A, 2B, 2C, 2D, 2E, 2F, 2G, 2H, 2I, 2J, 2K:
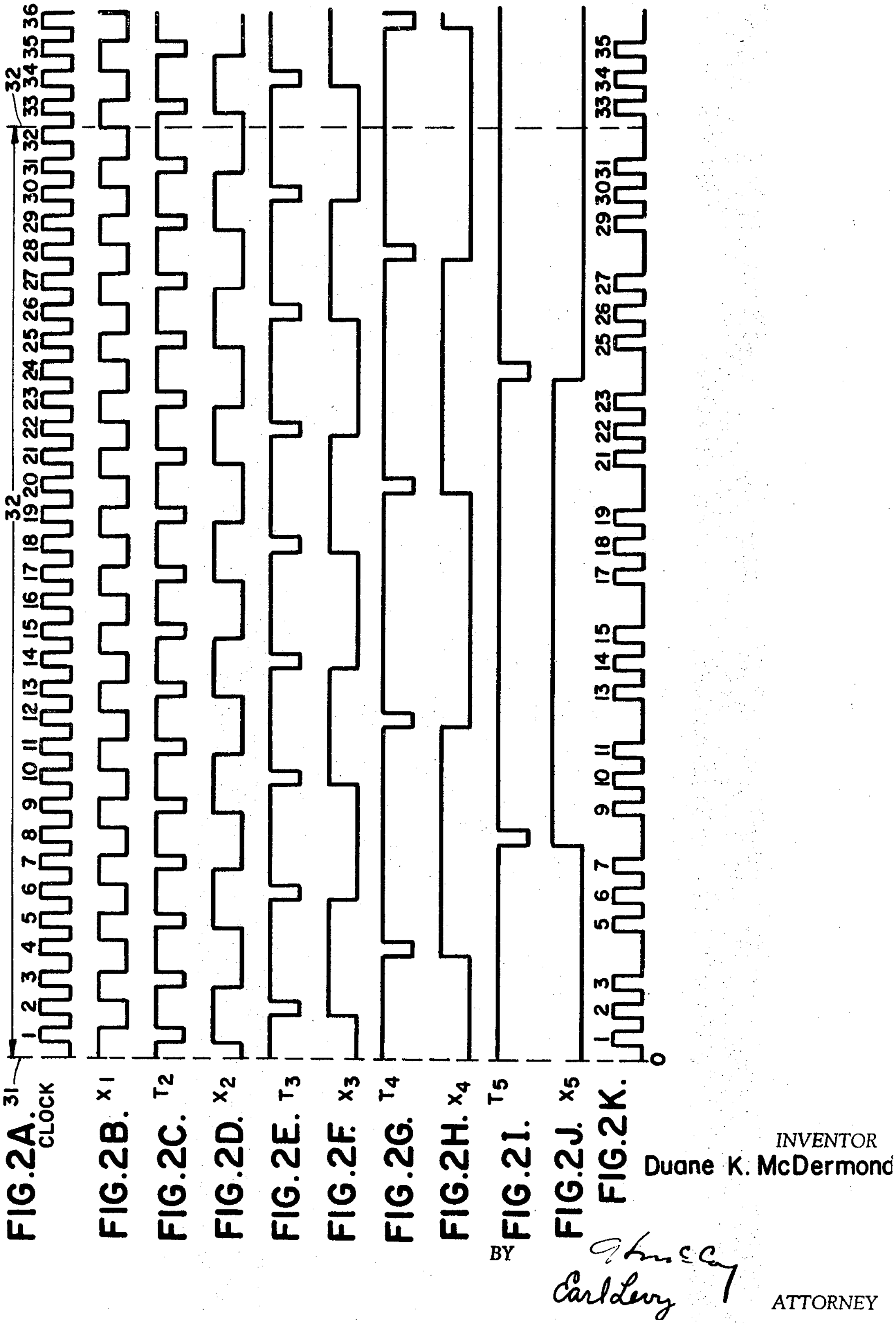
FIG. 2 is a series of waveforms illustrating the manner in which the circuit of FIG. 1 operates.

To provide a more complete understanding as to the manner in which the counter circuit of FIG. 1 functions, reference is made to the waveforms illustrated by FIG. 2 of the drawings. In FIG. 2A, 32 cycles of square wave clock source 16 are illustrated between lines 31 and 32. Pulses from clock source 16 are considered as having a binary zero level of ground and a positive voltage for the binary one state. Similarly, in the waveforms of FIGS. 2B–2J zero and positive voltages represent the binary zero and one states, respectively.

Flip-flop stage 11 responds to the square wave output voltage of clock source 16, so that it is triggered from one binary state to another in response to the trailing, negative going edge of each clock pulse. Hence, the waveform indicated by FIG. 2B is derived at the $X_1$ output terminal of flip-flop 11 while a complementary output is derived at flip-flop $\overline{X}_1$ output terminal. The waveform illustrated by FIG. 2B is combined with pulses from clock source 16 in NAND gate 21, the output of which is indicated by the waveform of FIG. 2C. From FIG. 2C, the output of NAND gate 21 is positive for three-quarters of each cycle and negative only during the interval defined by the $X_1$ output of flip-flop 11 and pulses from clock source 16, FIG. 2A, being positive. The negative going transition in the output of NAND gate 21 occurs in the center of the positive portion of the square wave derived from terminal $X_1$ of flip-flop 11.

The negative going transitions in the waveform of FIG. 2C, applied to the input terminal $T_2$ of flip-flop stage 12, switch the flip-flop state, whereby the $X_2$ waveform is indicated by FIG. 2D. From FIG. 2D, transitions in the output of flip-flop 12 occur in the center of the positive portion of the waveform derived from flip-flop 11. Hence, flip-flops 11 and 12 have transitions that occur with time displacements relative to each other and the power required from clock source 16 to activate the flip-flops is reduced compared to conventional prior art counters wherein the first and second counter stages are generally simultaneously activated. The number of pulses derived from flip-flop 12 is one-half the number of pulses generated by flip-flop 11, which in turn is one-half the number of clock pulses from source 16 whereby the output of flip-flop 12 is a divide by four frequency division of pulses from clock source 16.

The complementary output of flip-flop 11, derived at terminal $\overline{X}_1$, a phase inversion of the waveform indicated by FIG. 2B, is combined with pulses from clock source 16 and the $X_2$ output of flip-flop 12 in NAND gate 22. In response to the three inputs applied to it, NAND gate 22 derives the waveform indicated by FIG. 2E. From FIG. 2E, the output of NAND gate 22 is a positive voltage, except during the interval of $\overline{X}_1$, $X_2$ and the clock pulse source having positive voltages. Since all of the waveforms applied to NAND gate 22 are positive only during one pulse out of eight from clock 16, the output of NAND gate 22 is at ground voltage with a duty cycle of ⅛. The negative transitions in the output voltage of NAND gate 22 are applied to input terminal $T_3$ of flip-flop 13, whereby the $X_3$ output of flip-flop 13 is indicated by waveform of FIG. 2F. The waveform of FIG. 2F is a series of square waves, having a period 8 times that of clock pulse source 16, wherein transitions occur in the center of the square wave outputs of flip-flops 11 and 12.

NAND gate 23 responds to the $X_3$ square wave output of flip-flop 13, and the $X_1$ and $X_2$ complementary outputs of flip-flops 11 and 12, respectively, as well as to clock pulse source 16 to derive the rectangular wave input to flip-flop 14, as indicated by FIG. 2G. Flip-flop 14 responds to the negative transitions of the output of NAND gate 23 to derive the square wave of FIG. 2H, having a repetition rate of 1/16 of clock pulse source 16. From FIG. 2H, transitions in the output of flip-flop 14 occur in the center of the square wave outputs of flip-flops 11, 12 and 13, as indicated by FIGS. 2B, 2D and 2F, respectively.

The output of flip-flop 14 is combined with pulses from clock source 16 and the complementary outputs of flip-flops 11, 12 and 13 in NAND gate 24, having an output represented by the waveform of FIG. 2I. The output of NAND gate 24 is positive except during one positive pulse out of every 32 positive pulses in the wave train derived from clock pulse source 16. The ground voltages derived from each of NAND gates 21–24, as represented by the waveforms of FIGS. 2C, 2E, 2G and 2I, respectively, never simultaneously occur.

The negative transitions derived from NAND gate 24 are coupled to the input terminal $T_5$ of flip-flop 15, to activate the flip-flop so it derives the $X_5$ waveform of FIG. 2J. The FIG. 2J waveform is a square wave having a frequency equal to 1/32 the frequency of clock pulse source 16 and wherein transitions occur between transitions of the square wave outputs of each of flip-flops 11–14. Thus, an examination of the waveforms of FIGS. 2B, 2D, 2F, 2H and 2J, indicates that transitions in the outputs of flip-flops 11–15 are never simultaneous, whereby the amount of power required from clock source 16 to activate the several flip-flops from one state to another is minimized. The non-simultaneous occurrence of ground voltage from each of NAND gates 21–24 has the additional advantage of enabling the outputs of the several NAND gates to be combined in a relatively simple network, which may include only linear impedances.

While the circuit of FIG. 1 has been described in conjunction with a counter having only five stages to achieve a frequency division of 32, it is to be understood that the principles of the invention can be expanded to include a counter stage having any number of stages. In a generalized situation, where N counters are provided to effect a frequency division of $2^N$, N flip-flops and (N–1) NAND gates are provided; one NAND gate feeds the trigger input terminal of each flip-flop, except the first flip-flop. Each of the NAND gates responds directly to the input clock pulse source and the output of the preceding flip-flop and is supplied with the complementary output of each of the other flip-flops. Thus, for example, the NAND gate feeding the Ith flip-flop, where I is every integer between 2 and N inclusive, is supplied with inputs designated as C, $\overline{X}_1$, $\overline{X}_2$ . . . $\overline{X}_{I-2}$, $X_{I-1}$. Thereby, the Ith flip-flop is supplied with a gating waveform represented as:

$$C \cdot \overline{X}_1 \cdot \overline{X}_2 \ldots \overline{X}_{I-2} \cdot X_{I-1}$$

While NAND gates are preferably employed as the logical combining circuits feeding the input terminals of the various flip-flops, it is to be understood that the Boolean equivalents of the NAND gate logic can be employed. For example, if inverter and OR gates are utilized in place of NAND gates, these gates are arranged to provide an input to the Ith stage in accordance with the Boolean expression:

$$\overline{C}+X_1+X_2+ \ldots +X_{I-2}+\overline{X_{I-1}}$$

Because the inputs to the various flip-flops in the circuit of FIG. 1 have ground potential at different times, these waveforms are advantageously employed for selectively supplying pulses to a multilevel, or frequency, digital oscillator. One particular circuit configuration for deriving, on a selective basis, 64 different square wave output frequencies is illustrated by the block diagram of FIG. 3.

Figure 3:
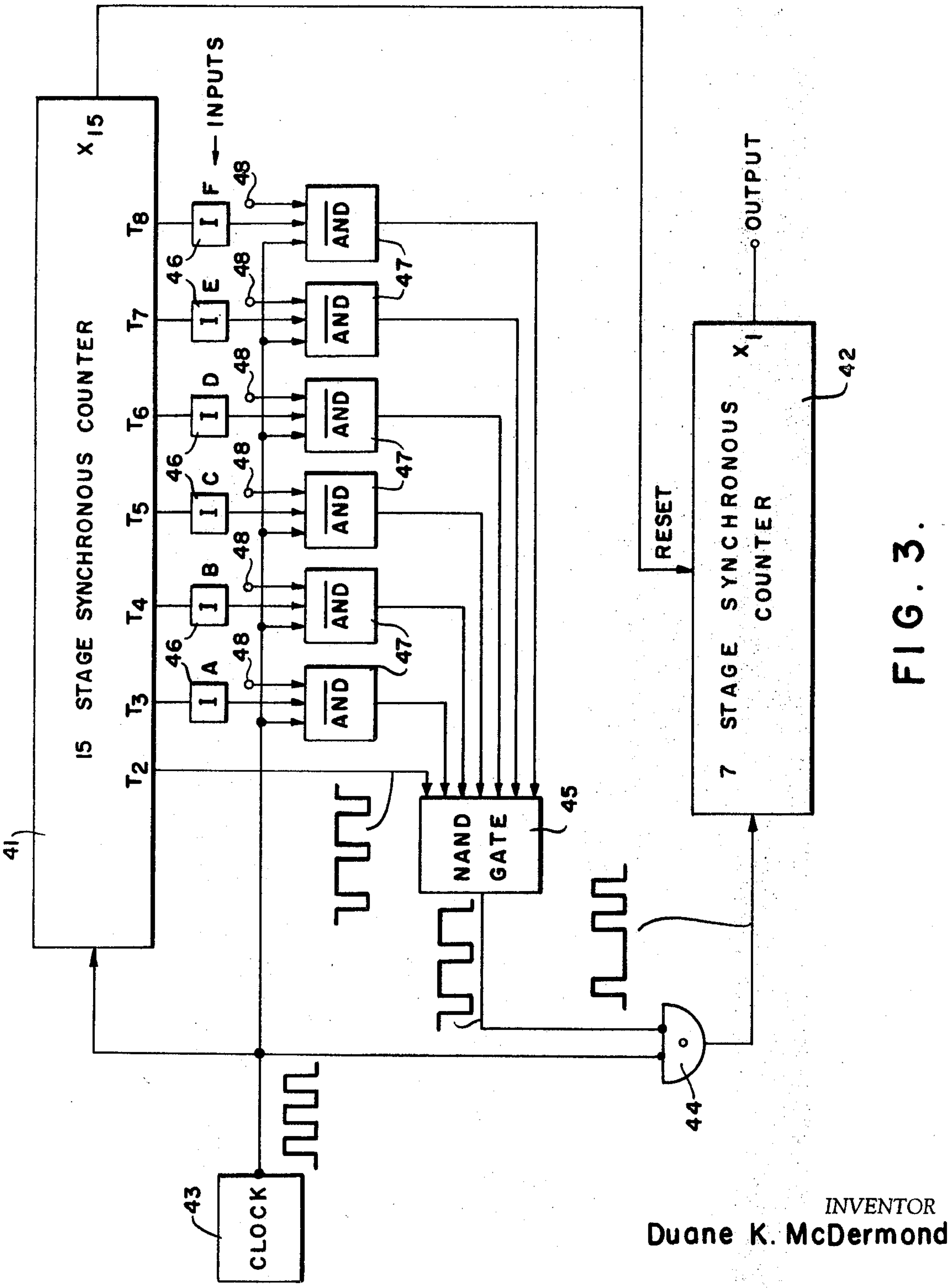
FIG. 3 is a block diagram of a system in which a counter based upon the principles of FIG. 1 can be incorporated in a digitally controlled oscillator.

In the circuit diagram of FIG. 3, two synchronous counters 41 and 42 are provided. Synchronous counter 41 includes 15 stages and is constructed in a manner similar to the five stage counter of FIG. 1, utilizing the generalized rules given supra. Counter 41 includes seven output terminals $T_2$–$T_8$, taken respectively from the outputs of the NAND gates driving the second through eighth flip-flop stages of the counter. Counter 41 includes fifteen stages to derive a periodically occurring pulse for resetting counter 42. The connection between counters 41 and 42 enables the 7 stage counter 42 to derive a constant frequency and predetermined phase output signal independently of frequency drift of clock source 43.

Synchronous counter 42 includes 7 binary stage, to provide a frequency division of $2^6=64$, and can be a conventional counter or a counter of the type illustrated by FIG. 1. Counters 41 and 42 are driven in parallel by periodically occurring pulses from square wave clock source 43, with pulses derived from the stage of counter 41 being selectively gated to the count advance input of counter 42 with the clock pulse sources by AND gate 44.

To provide a periodic signal at the output of the last stage of seven stage counter 42, the counter is periodically reset after 15 stage counter 41 has been cycled through a complete operating sequence. To this end, the last stage of counter 41 is connected to the reset input of counter 42, to return the latter counter to an initial condition of each stage being set to a binary zero state simultaneously with the stages of counter 41 being similarly activated.

By selectively feeding the $T_2$–$T_8$ outputs of counter 41 to NAND gate 45, pulses from counter 41 are selectively coupled to AND gate 44. The $T_2$ output of counter 41 is coupled directly to NAND gate 45, while each of the remaining outputs of counter 41 ($T_3$–$T_8$) is coupled to the NAND gate 45 via the cascaded combination of polarity inverters 46 and NAND gates 47. Each of NAND gates 47 is driven in parallel by pulses from clock source 43 and is selectively connected to control gating voltages at terminals 48A–F. Each of the control voltages at terminals 48A–F selectively has a ground or a positive value, depending on the desired properties of the waveform generated by NAND gate 45. In response to the voltages at terminals 48 being at the ground and positive levels, the corresponding signals at terminals $T_3$–$T_8$ are not gated through the corresponding NAND gates to NAND gate 45.

Coupling of signals from terminals $T_3$–$T_8$ to the input of NAND gate 45 is understood by considering a specific example; assume that the waveform at terminal $T_3$ is indicated by FIG. 2E and that the voltage at terminal 48A is initially positive. Under the assumed conditions, inverter 46 responds to the waveform of FIG. 2A, at terminal $T_3$, to provide an inverted replica of the $T_3$ output. The positive portion of the inverted $T_3$ replica is combined with the positive voltages of clock source 43 at terminal 48A, whereby the output of NAND gate 47 is negative.

During all other portions of the rectangular waveform derived by inverter 46, when the inverter output is at a zero level, the output of NAND gate 47 is maintained at a positive voltage. Thereby, the positive voltage applied to terminal 48A causes the output of NAND gate 47 to follow and be identical in shape with the voltage at terminal $T_3$ of counter 41. When, however, a negative voltage is applied to terminal 48A, the NAND gate 47 responsive to the voltage at terminal $T_2$ is activated so that the output thereof is always positive. Thereby, the output of NAND gate 47 cannot follow transitions in the voltage derived from terminal $T_3$ of counter 41.

NAND gate 45 inverts the waveforms at terminal $T_2$ and the output terminals of the six NAND gates 47 which are activated. Inversion of only the activated NAND gates occurs because a ground potential can be derived from only one of the NAND gates or terminal $T_2$ at a time, whereby at any time instant all of the inputs to NAND gates 45 are positive, except possibly one. Consider the instance when zero control voltage is applied to each of terminals 48A–48F, whereby each of NAND gates 47 generates a positive voltage. The positive voltages applied by NAND gates 47 to the input terminals of NAND gate 45 enable NAND gate 45 to respond to the rectangular waveform derived from terminal $T_2$. In response to the negative transitions in the waveform derived from terminal $T_2$, NAND gate 45 generates positive voltages, and at all other times the NAND gate output is at a zero level.

Now consider the case wherein a positive voltage is applied to terminal 48A, whereby the output of the NAND gate 47 connected to terminal 48A is a replica of the voltage at terminal $T_3$, as indicated by the waveform of FIG. 2E. NAND gate 45 responds to the output of the NAND gate 47 connected to terminal 48A and the voltage at terminal $T_2$ of counter 41, as indicated by the waveform of FIG. 2C, to derive an output voltage that is positive only when the two signals being coupled thereto are at ground level. At all other time instants, the output of NAND gate 45 is at ground potential, as indicated by the waveform indicated by FIG. 2K.

In the manner described specifically for the NAND gate 47 connected to terminal 48, the outputs of the other NAND gates are selectively combined in NAND gate 45 to fill the gaps in the wave train derived from NAND gate 45, depending upon the desired repetition rate of the output of synchronous counter 42. Consider the waveforms of FIG. 2 to determine the manner by which the gaps are filled; specifically coupling the $T_4$ output, FIG. 2G, to NAND gate 45 fills the gap between the third and fifth pulses in clock source 43 while the $T_5$ pulse, indicated by the waveform of FIG. 2I, fills the gap between the seventh and ninth clock pulse from source 43.

The output of NAND gate 45 is combined with synchronizing pulses from clock source 43 in AND gate 44 to drive counter 42 so it derives voltages related in frequency to the repetition rate of the NAND gate 45 output. The manner in which synchronous counter 42 responds to the selectively non-periodic inputs thereto to derive variable frequency signals, depending upon the repetitive nature of its input pulses, is described more fully in the copending application of Roger C. Cliff, Ser. No. 576,183, filed Aug. 26, 1966, now U.S. Pat. 3,464,018 assigned to the same assignee as the present invention, and need not be described in detail herein.

While I have described and illustrated one specific embodiment of my invention, it will be clear that variations of the details of construction which are specifically illustrated and described may be made without departing from the true spirit and scope of the invention as defined in the appended claims.

What is claimed is:

1. A frequency dividing counter responsive to a source of bi-level signals comprising at least three cascaded bistable stages, means connecting the first of said stages to be responsive to said source, logic means interconnecting the other of said stages with each one another, said first stage and said source for changing the state of only one of said stages in response to a transition of said source between one of said levels, and wherein each of said stages, except the first, is responsive to a signal derived by a NAND gate; the NAND gate feeding the Ith stage being directly responsive to the output of the first stage and the source and being responsive to the complement of each of the 2 . . . (I–1)th stages; where I is selectively every one of said stages, except the first.

2. A frequency dividing counter responsive to a source of bi-level square wave signal comprising at least three cascaded bi-stable stages, means connecting the first of said stages to be responsive to said source, and logic means interconnecting the other of said stages with each one another, said first stage and said source for changing the state of the Ith one of said other stages midway between transitions of the (I–1)th one of said stages, where I is selectively every one of said stages, except the first.

3. The counter of claim 2 wherein each of said stages, except the first, is responsive to a signal derived by a NAND gate the NAND gate feeding the Ith stage being directly responsive to the output of the first stage and the source and being responsive to the complement of each of the 2 . . . (I–1)th stages, where I is selectively every one of said stages, except the first.

4. The counter of claim 2 where said logic means includes a logic circuit feeding each of said stages, except the first, the logic means feeding the Ith stage combining the output of the source and the outputs of the first, second, third . . . (I–1)th stages in accordance with $$C \cdot X_1 \cdot \overline{X}_2 \cdot \overline{X}_3 \ldots (\overline{X_{I-1}})$$

where:

C is indicative of the binary value of the source;

$X_1$ is indicative of the binary value of the first stage;

$\overline{X}_2$, $\overline{X}_3$ and $(\overline{X_{I-1}})$ are the complements of the outputs of the second, third and (I–1)th stages, respectively; and I is selectively every one of the stages.

5. A frequency dividing counter responsive to a source of bi-level signal comprising at least three cascaded bistable stages, means connecting the first of said stages to be responsive to said source, and logic means interconnecting the other of said stages with each one another, said first stage and said source, said logic means including a logic circuit feeding each of said stages, except the first, the logic means feeding the Ith stage combining the output of the source and the outputs of the first, second, third . . . (I–1)th stages in accordance with:

$$C \cdot X_1 \cdot \overline{X}_2 \cdot \overline{X}_3 \ldots (\overline{X_{I-1}})$$

where:

C is indicative of the binary value of the source;

$X_1$ is indicative of the binary value of the first stage;

$\overline{X}_2$, $\overline{X}_3$ and $(\overline{X_{I-1}})$ are the complements of the outputs of the second, third and (I–1)th stages, respectively; and I is selectively every one of the stages.

6. The counter of claim 5 wherein the logic circuit for each of said stages comprises a NAND gate.

7. The counter of claim 5 further including means for selectively combining the signals applied to each of said other stages to derive a bi-level wave form.

8. The counter of claim 7 further including a counter responsive to said derived wave form.

References Cited

UNITED STATES PATENTS

| | | | |
|---|---|---|---|
| 3,264,567 | 8/1966 | Prieto | 307—224 |
| 3,349,332 | 10/1967 | Bleickardt | 328—42 |

OTHER REFERENCES

Pulse, Digital and Switching Waveforms by Millman and Taub, copyright 1965, by McGraw-Hill Inc., p. 681, Fig. 18–10.

JOHN S. HEYMAN, Primary Examiner

U.S. Cl. X.R.

328—48, 51